UNITED STATES PATENT OFFICE.

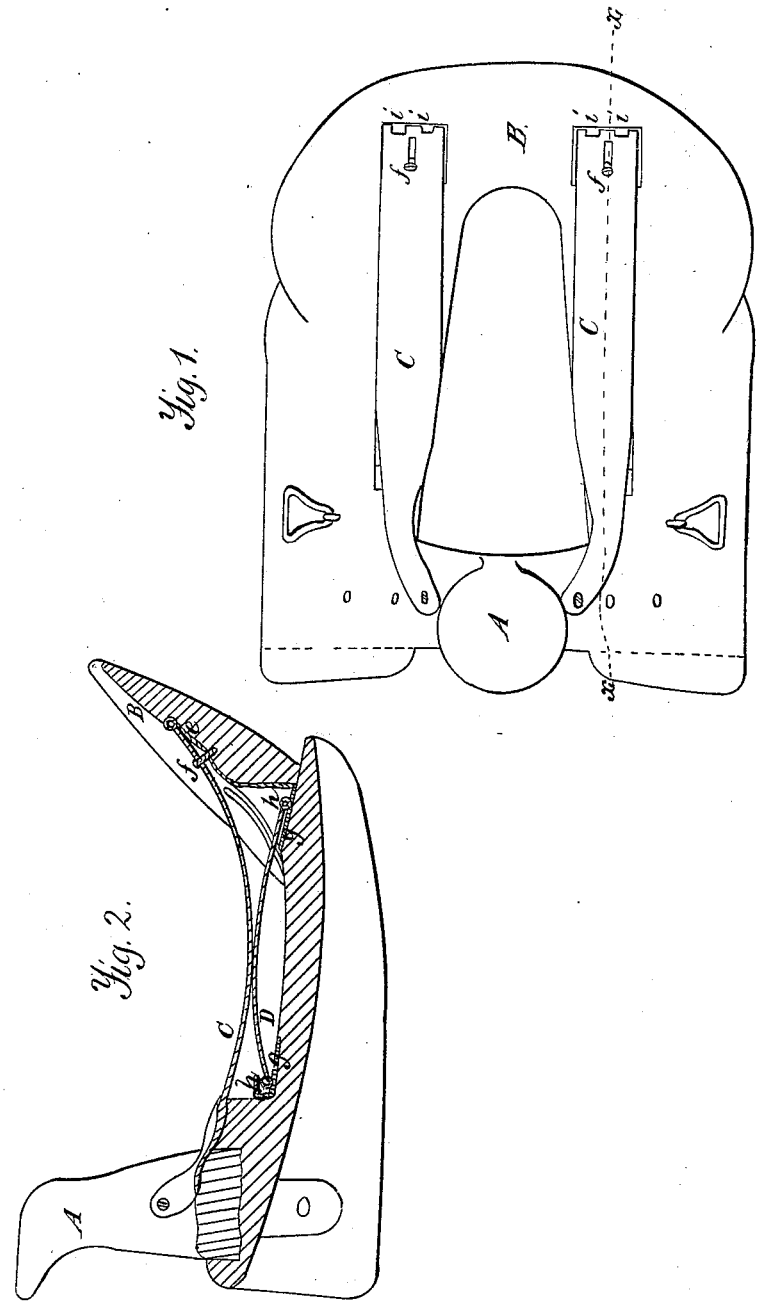

J. RHOADES AND W. POULEY, OF SHIPPENSBURG, PENNSYLVANIA.

SPRING-SADDLE.

Specification of Letters Patent No. 6,472, dated May 22, 1849.

*To all whom it may concern:*

Be it known that we, JEREMIAH RHOADES and WILLIAM POULEY, of Shippensburg, in the county of Cumberland and State of Pennsylvania, have invented a new and Improved Arrangement of Springs for Supporting the Seats of Saddles; and we do hereby declare the following to be a full, clear, and exact description thereof, reference being had to the accompanying drawings, making a part of this specification, in which—

Figure 1, is a top view, and Fig. 2, a vertical longitudinal section (in the line $x, x$, of Fig. 1,) of a saddle tree with which our improved arrangement of springs is combined.

Similar letters indicate like parts in both figures.

A, is the pommel and B, is the cantel of a saddle tree constructed in the usual manner.

C, C, are metallic springs combined with the pommel and cantel, and occupying the same positions as the webbing usually employed for supporting the seat of a saddle; the front ends of the spring C, C, are confined to the sides of the pommel by screws and their rear ends fit into metal lined grooves e, e, formed in the cantel.

The springs C, C, are made straight or nearly so, and are sprung into the proper position for receiving a saddle seat, as represented in Fig. 2; in which position they are retained by their rear ends striking against the shoulders at the upper extremities of the grooves e, e, and by the heads of the screws f, f, the shanks of which, pass through slots near the rear ends of the springs, and enter the base of the grooves e, e.

Friction rollers i, i, are placed at the rear ends of the spring C, C, upon which the weight placed upon the springs rests, and which traverse freely up and down the inclined base of the grooves e, e, when the saddle is in use.

The bent form given to the springs C, C, combined with the tension to which they are subjected, and the counteracting effect of the heads of the screws f, f, prevent all tremor and upward vibration of the springs and cause an easy and gentle vertical movement, whether the rider be light or heavy, a skillful or an unskillful rider. In the above described manner of producing this desirable result and great improvement on spring seated saddles, consists the novelty and merit of our invention.

D, D, are counteracting springs placed under and acting in conjunction with the saddle seat springs C, C; the springs D, D, rest upon friction rollers h, h, placed at their extremities, which traverse freely in metal lined guiding cavities g, g, formed in the side bars, as represented in Fig. 2.

What we claim as our invention and desire to secure by Letters Patent, is—

The combination and arrangement of the bent tension springs C, C, for supporting the saddle seat, with the pommel and cantel of the tree, in such a manner as to effectually preserve the proper form of the springs and also prevent all upward reaction and tremor of the same when in use, substantially as herein set forth: to wit; securing the front ends of the springs C, C, to the sides of the pommel by means of bolts or screws, and springing the rear ends of the said springs into inclined grooves e, e, formed in the cantel, and confining them therein by the screws f, f, passing through slots in the springs into the bottoms of the said grooves e, e.

The above specification signed and witnessed this twenty-second day of Feb., 1849.

JEREMIAH RHOADES.
WILLIAM POULEY.

Witnesses:
BENJAMIN DUKE,
DAVID S. HOCK.